US009854626B2

(12) United States Patent
Deenen et al.

(10) Patent No.: US 9,854,626 B2
(45) Date of Patent: Dec. 26, 2017

(54) THICK FILM HEATERS

(75) Inventors: Reinardus Hermanus Bernardus Deenen, Zevenaar (NL); Willem Antoon Bernard Nijman, Ulft (NL); Johannes Gerardus Maria Gelinck, Groenlo (NL); Martijn Van Dongen, Doetinchem (NL); Gradus Johannes Kloppers, Gaanderen (NL); Robert Henry Hadfield, Marple Cheshire (GB)

(73) Assignee: Ferro Techniek Holding B.V., Gaanderen (NL)

( * ) Notice: Subject to any disclaimer, the term of this patent is extended or adjusted under 35 U.S.C. 154(b) by 747 days.

(21) Appl. No.: 13/704,763

(22) PCT Filed: Jun. 15, 2011

(86) PCT No.: PCT/GB2011/051118
§ 371 (c)(1),
(2), (4) Date: Mar. 4, 2013

(87) PCT Pub. No.: WO2011/158028
PCT Pub. Date: Dec. 22, 2011

(65) Prior Publication Data
US 2013/0168379 A1 Jul. 4, 2013

(30) Foreign Application Priority Data

Jun. 15, 2010 (GB) .................................. 1009993.5
Nov. 3, 2010 (GB) .................................. 1018549.4

(51) Int. Cl.
*H05B 3/68* (2006.01)
*H05B 1/02* (2006.01)
(Continued)

(52) U.S. Cl.
CPC ............ *H05B 1/0297* (2013.01); *B23P 11/00* (2013.01); *F24C 7/067* (2013.01); *F24H 1/105* (2013.01);
(Continued)

(58) Field of Classification Search
CPC .......... B23P 11/00; F24C 7/067; F24H 1/105; F24H 1/121; H05B 1/0261; H05B 1/0297;
(Continued)

(56) References Cited

U.S. PATENT DOCUMENTS 5,396,047 A * 3/1995 Schilling et al. ........ 219/448.11
5,437,003 A * 7/1995 Blanco .................... F24H 1/103
392/485

(Continued)

FOREIGN PATENT DOCUMENTS

DE 19732414 A1 2/1999
GB 2305233 A 4/1997
(Continued)

OTHER PUBLICATIONS

English translation of DE19732414, 1999.*

*Primary Examiner* — Sang Y Paik
(74) *Attorney, Agent, or Firm* — The Webb Law Firm

(57) ABSTRACT

The invention relates to a combination of an electrical heating element and a heat dissipater to be heated thereby; the heating element comprises a substrate, an insulating layer located on the substrate and a thick film conductor located on the insulating layer, wherein the second side of the metallic substrate is in contact with the heat dissipater, comprising a layer of metallic material on its face towards the heater and wherein the substrate is brazed to the heat dissipater and the surface of the heating element over which the thick film conductor extends, is substantially equal to the surface of the heat dissipater. The brazing leads to a permanent contact between the heating element and the heat dissipater, so that the possible tendency for warping as caused by the heating and cooling cycles will be withstood.

51 Claims, 15 Drawing Sheets

(51) Int. Cl.
*F24H 1/12* (2006.01)
*F24H 1/16* (2006.01)
*H05B 3/22* (2006.01)
*B23P 11/00* (2006.01)
*F24C 7/06* (2006.01)
*F24H 1/10* (2006.01)
*H05B 3/26* (2006.01)

(52) U.S. Cl.
CPC ............. *F24H 1/121* (2013.01); *F24H 1/162* (2013.01); *H05B 1/0261* (2013.01); *H05B 3/22* (2013.01); *H05B 3/262* (2013.01); *H05B 2203/013* (2013.01); *H05B 2203/017* (2013.01); *H05B 2203/021* (2013.01); *Y10T 29/49826* (2015.01)

(58) Field of Classification Search
CPC ........ H05B 2203/013; H05B 2203/017; H05B 2202/021; H05B 3/22; H05B 3/262; Y10T 29/49826
USPC .... 219/443.1–468.2, 530–548; 392/465–503
See application file for complete search history.

(56) References Cited

U.S. PATENT DOCUMENTS

| | | | |
|---|---|---|---|
| 5,557,704 A | 9/1996 | Dennis et al. | |
| 6,046,438 A * | 4/2000 | Slegt | 219/441 |
| 7,417,857 B2 * | 8/2008 | Rondier et al. | 361/699 |
| 7,796,868 B2 | 9/2010 | Kaastra | |
| 8,515,268 B2 * | 8/2013 | Anliker | 392/497 |
| 2002/0071665 A1 | 6/2002 | Bliek et al. | |
| 2003/0007790 A1 * | 1/2003 | Harris | 392/487 |
| 2009/0060481 A1 | 3/2009 | Kaastra | |
| 2010/0276173 A1 * | 11/2010 | Birkenstock et al. | 174/50.5 |

FOREIGN PATENT DOCUMENTS

| | | |
|---|---|---|
| GB | 2324014 A | 10/1998 |
| GB | 2351894 A | 1/2001 |
| JP | 53139343 | 12/1978 |
| WO | 0227246 A1 | 4/2002 |
| WO | 2005080885 A1 | 9/2005 |
| WO | 2006083162 A1 | 8/2006 |
| WO | 2007037694 A1 | 4/2007 |
| WO | 2008150172 A1 | 12/2008 |

* cited by examiner

THICK FILM HEATERS

FIELD OF THE INVENTION

This invention includes improvements relating to flow through heaters for liquid heating appliances and in particular an electrical heating element comprising a combination of a thick film resistor and a heat dissipater.

The invention concerns an assembly comprising of a combination of an electrical heating element and a heat dissipater to be heated by the electrical heating element, the heating element comprising a metal substrate, an insulating layer located on one side of the substrate and a thick film resistor located on the insulating layer, wherein the second side of the substrate is in contact with the heat dissipater.

BACKGROUND OF THE INVENTION

Such combinations are generally known in the field of water heating kettles, flow heaters and heaters for food, like baking plates used in fast food restaurants or braising pans. In these prior art combinations of heaters and dissipaters, the heating element is attached to the heat dissipater by bolts and nuts, external clamping means or a bonding layer between the heating element and the heat dissipater.

The proprietor's granted patent GB-A-2 351 894 discloses a brazed connection between a heater and a heat dispersion plate. However, in this prior art solution the surface area of the heating element is substantially smaller than that of the heat dissipater. Hence an additional heat dispersion layer is present between the heating element substrate and the heat dissipater. The size of the heat dispersion layer is larger than that of the heating element, so that the heat transfer takes place over only a part of the surface of the dispersion layer which will result in a slower heat up time and a temperature gradient across the heat dissipater which may be a problem, for example in flow through heater applications.

Prior art flow through heaters that rely upon magnesium filled heating elements are also well known and generally fall into two categories.

The first category relies upon a spiral tube and a magnesium-filled sheathed heating element being diecast or stamped into an alloy or aluminium casting which acts as a dissipater. Generally the power to mass ratio is very low, typically between 1.5 and 2 watts per gram. These heater assemblies are suitable to heat water close to boiling point providing the flow rate of the water to be heated is constant. However these heater types are slow to heat up and slow to react to changing conditions such as the flow rate of the water. Additional tubular heaters may be incorporated, but these add to the cost and increase the size and mass of the assembly.

The second type relies upon one or more magnesium filled sheathed heating elements being attached to a straight tube. This type does have higher power to mass ratio however the heat transfer is slow, which is satisfactory if run at lower temperatures, for example in a washing machine; however they tend to overheat and cause steam if temperatures closer to the boiling point are required.

Prior art flow through heaters are also known that incorporate thick film heaters as a heat source, for example, as described in the proprietor's patent publication WO-A-2005/080885. However, these also suffer from problems related to the control of the water temperature and complexity of assembly.

Furthermore, prior art flow through heaters are also known to have channels provided in the flow through heater assembly, for example as described in the proprietor's patent publication WO-A-2007/037694. However, these also suffer from problems relating to complexity of assembly due to the increased number of components used to form the flow through heater assembly, and therefore add cost and increase manufacturing time of the assembly.

In view of the recent trend to smaller and quicker reacting liquid heating devices that do not rely upon the need to store heated liquid, it is advantageous to increase the power density of the heating means without the risk of the temperature overshooting to boiling point. When increasing the power density it is essential to ensure the integrity of the mechanical and thermal contact between the heating element and the heat dissipater. With prior art techniques in connecting the heating element with the heat dissipater, lowering the thermal mass may lead to warping of one or both of the components, which can result in a reduced contact area between the heating element and the dissipater reducing the optimal heat transfer.

This problem is in particular present in situations where in the overall power density is high, for instance higher that 8 W/cm$^2$. It would be advantageous to provide a high power density combination wherein the transfer of heat from the heater to the heat dissipater is maintained, throughout the lifetime of the component.

SUMMARY OF THE INVENTION

According to one aspect of the present invention, there is provided a flow-through heater comprising a thick film electrical heating element having a metallic substrate, and a channel plate joined to the metallic substrate to form a channel therebetween, characterised in that adjacent portions of the channel are separated by substantially planar contact portions of the channel plate, which are secured to the substrate According to another aspect of the invention there is provided a flow-through heater comprising a thick film electrical heating element having a metallic substrate, and characterised by a flow-through tube joined to the metallic substrate.

According to another aspect of the invention there is provided a flow-through heater comprising a heating element having at least one thick film heating track formed on one side of a substrate, and a flow-through channel formed on the other side of the substrate, characterised in that the heating track is substantially aligned with the flow-through channel.

According to another aspect of the invention there is provided a flow-through heater assembly comprising:
  a. a thick film electrical heating element having a metallic substrate,
  b. a channel plate joined to a first side of the substrate to form a channel therebetween,
  c. a fluid connector assembly, positioned to said first side of the substrate, providing an inlet and outlet to the channel; and
  d. a housing, positioned to a second side of the substrate, opposite to said first side, providing an electrical connection to the heating element.

According to another aspect of the present invention, there is provided an electrical heating apparatus comprising a thick film electrical heating element having a metallic substrate soldered or brazed to a metallic face of a heat dissipater, characterized in that the thick film heating track of the electrical heating element extends over substantially the entire surface of the heat dissipater.

According to another aspect of the present invention there is provided a heat dissipater of metallic material, a heater substrate of metallic material in which a thick film heater is applied on one side with the opposite side of the heating substrate attached over substantially its full surface to the heat dissipater and that the surface of the heating substrate over which the thick film conductor extends, is substantially equal to the surface of the heat dissipater.

According to a further aspect of the invention there is provided a method for producing a combination of an electrical heating element and a heat dissipater to be heated by the electrical heating element. The method provides a heating element comprising a substrate, an insulating layer located on one side of the substrate and at least one thick film conductor located on the insulating layer and providing a heat dissipater comprising a layer of metallic material, wherein the substrate of the heater is made of metallic material and that the substrate is brazed over substantially its full surface to the metallic layer of the heat dissipater.

According to a further aspect of the invention there is provided a complete assembly including the heating element and dissipater according to one of the previous aspects, and attachment means for the inlet and outlet apertures, electrical connections and/or temperature sensing components.

According to a further aspect of the invention there is provided a complete assembly including the heating element and dissipater according to one of the previous aspects, and attachment means for the inlet and outlet apertures, electrical connections and/or temperature sensing components including a discrete integrated sensor housing.

BRIEF DESCRIPTION OF THE DRAWINGS

There now follows, by way of example only, a detailed description of preferred embodiments of the present invention, with reference to the figures identified below.

FIGS. 6b and 6c are plan views respectively of the top side and the underside of the complete heating assembly depicted in FIG. 6a.

FIGS. 7b and 7d are plan views respectively of the top side and the underside of the complete heating assembly depicted in FIG. 7a.

FIGS. 7c and 7e are plan views respectively of the top side and the underside of a flow through heater assembly depicted in FIG. 7a.

FIGS. 8a and 8b are front and back isometric views of an integrated sensor housing with a sensor depicted in FIG. 7a.

FIG. 8c is an exploded diagram of mechanical attachment means for the integrated sensor housing assembly depicted in FIG. 7a.

FIG. 8d is a cut away view of the integrated sensor housing assembly with the mechanical attachment means depicted in FIG. 7a.

FIG. 9a is an exploded diagram of mechanical attachment means for conduits depicted in FIG. 7a.

FIG. 9b is a cut away view of the conduits with the mechanical attachment means depicted in FIG. 7a.

DETAILED DESCRIPTION OF THE EMBODIMENTS

Overview—Brazing Heat Dissipater to Element Plate

Figure 1:
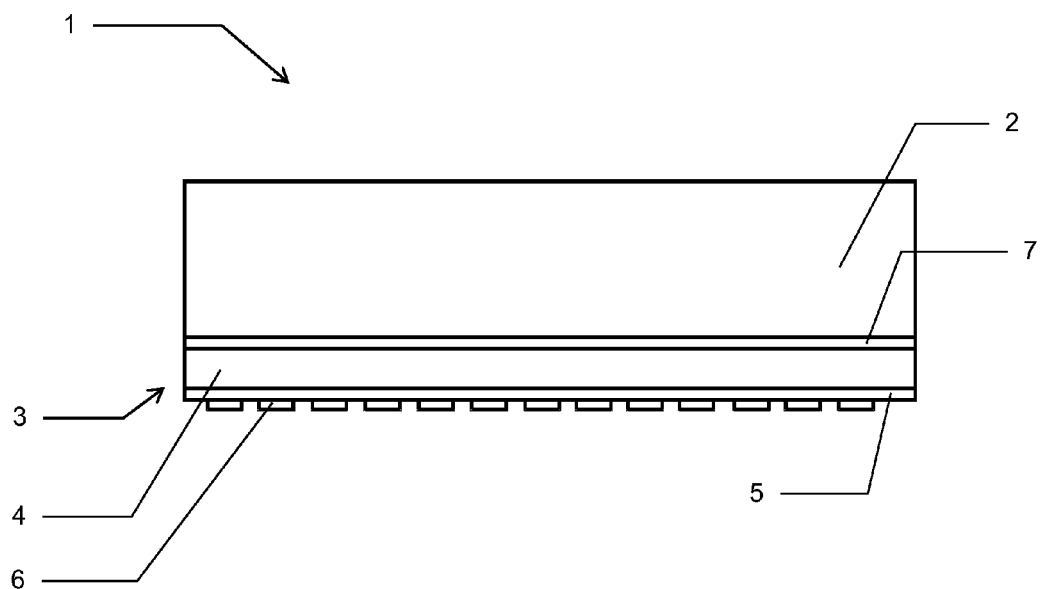
FIG. 1 is a cross sectional diagram for explaining an aspect of the present invention.

FIG. 1 shows an assembly 1 comprising a heat dissipater 2 and a thick film heating element 3. The thick film element 3 comprises a substrate 4 of thermally well conducting material, such as a metal, and an electrically insulating layer 5 applied on the lower side of the substrate 4. This electrically insulating layer 5 should have reasonable or good thermal conducting properties, and may for example comprise vitreous enamel. On the lower side of the insulating layer 5 at least one resistor track 6 has been applied by the 'thick film' technique, which is known from the prior art and may include overheat protection or regulating features as used in the proprietor's embedded and or parallel E-fast™ protection system and/or as disclosed in WO-A-2006/083162 or WO-A-2008/150172. The heating element 3 may be joined with the heat dissipater 2 by brazing, resulting in an alloy layer 7 connected to both the heat dissipater 2 and the electrical heating element 3. Further details of this brazing are described in the 'Brazing' section below.

First Embodiment

Figure 2:
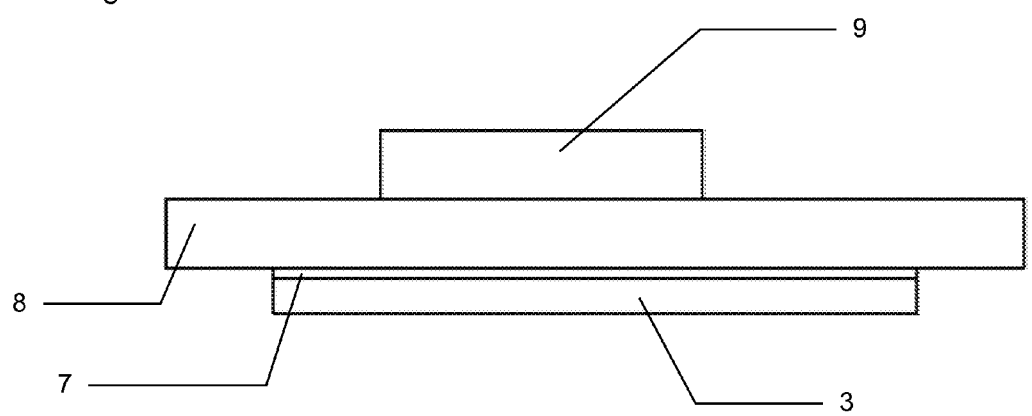
FIG. 2 is a cross sectional diagram of a first embodiment of the present invention.

In FIG. 2 an application of such a combination is shown as a baking or hot plate 8. As shown in this figure, a thick film heating element 3 has been provided under the baking or hot plate 8. The insulating layer 5 and the conductor in thick film techniques are not illustrated, although these parts are present in these and further embodiments. Herein the heating element 3 extends over a relative large proportion of active area of the plate 8. The parts of the plate 8 extending outside the heating element 3 serve only to support the plate 8, for example in an appliance housing. Just as in the preceding case the thermal mass of the heat dissipater 2 (the heating plate 8 in this embodiment) is substantial, so that a constant heat is maintained when cold food for example a burger 9 is placed on the plate. It will be clear that a similar configuration can be used for heating liquid in a vessel, for example a water cooker or kettle.

Present embodiments for hot plates rely upon the thick film heating element being attached to the heating plate by mechanical means in which case the hot plate is manufactured from a 3 mm deep material so that the assembly does not distort. It is expected that the brazed assembly will form a composite 'sandwich' whose overall depth is 3 mm or less, so that that material of the top plate may be reduced substantially. This thinning of the substrate 4 would be particularly advantageous for deep fat fryer or bain marie type applications where the vessels are made from thinner materials.

In further embodiments it is envisaged that the thick film materials may be printed directly onto one or more sides of the heat dissipater, so removing the need to for a separate substrate and the subsequent fixture of the separate substrate to the dissipater. In that case it will be necessary to match the materials of the dissipater and the thick film so that the melting temperature of the dissipater material is greater than the processing temperatures of the insulating layers and associated heating tracks.

In the embodiments described so far, the thermal capacity or thermal mass of the heat dissipater is substantial, leading to relatively long thermal time constraints; for example a delay between switching on and the required liquid temperature being achieved. In numerous situations there is the need for combinations having substantial shorter time constraints. This is particularly important in instant water heaters adapted to serve brewed drinks on demand.

Second Embodiment

Figure 3:
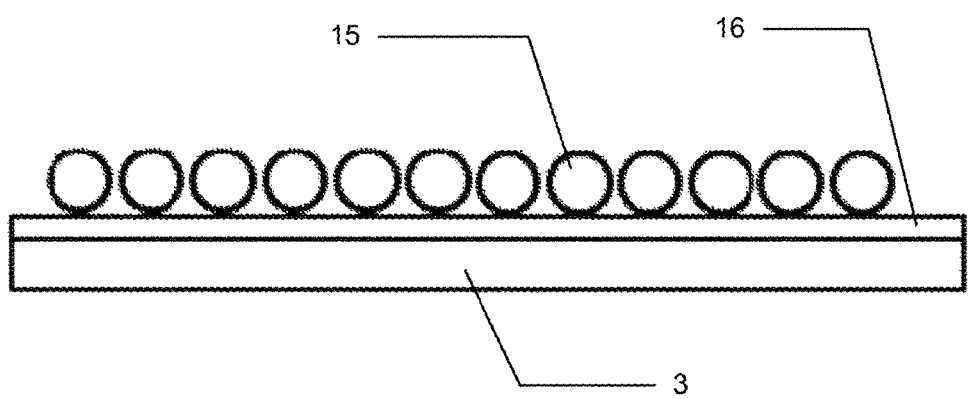
FIG. 3 is a cross sectional diagram of a second embodiment of the present invention.

A second embodiment illustrated in FIG. 3 has a low mass assembly. This embodiment comprises a tube 15 wound in a spiral or coil to cover a substantial area of the heating element 3. The tube 15 is brazed to the heating element 3 through a brazing alloy layer 16 which during the brazing process assumes the shape of the tube 15. This assumed shape increases the surface area of the contact between the heating element 3 and the tube 15.

Third Embodiment

Figure 4:
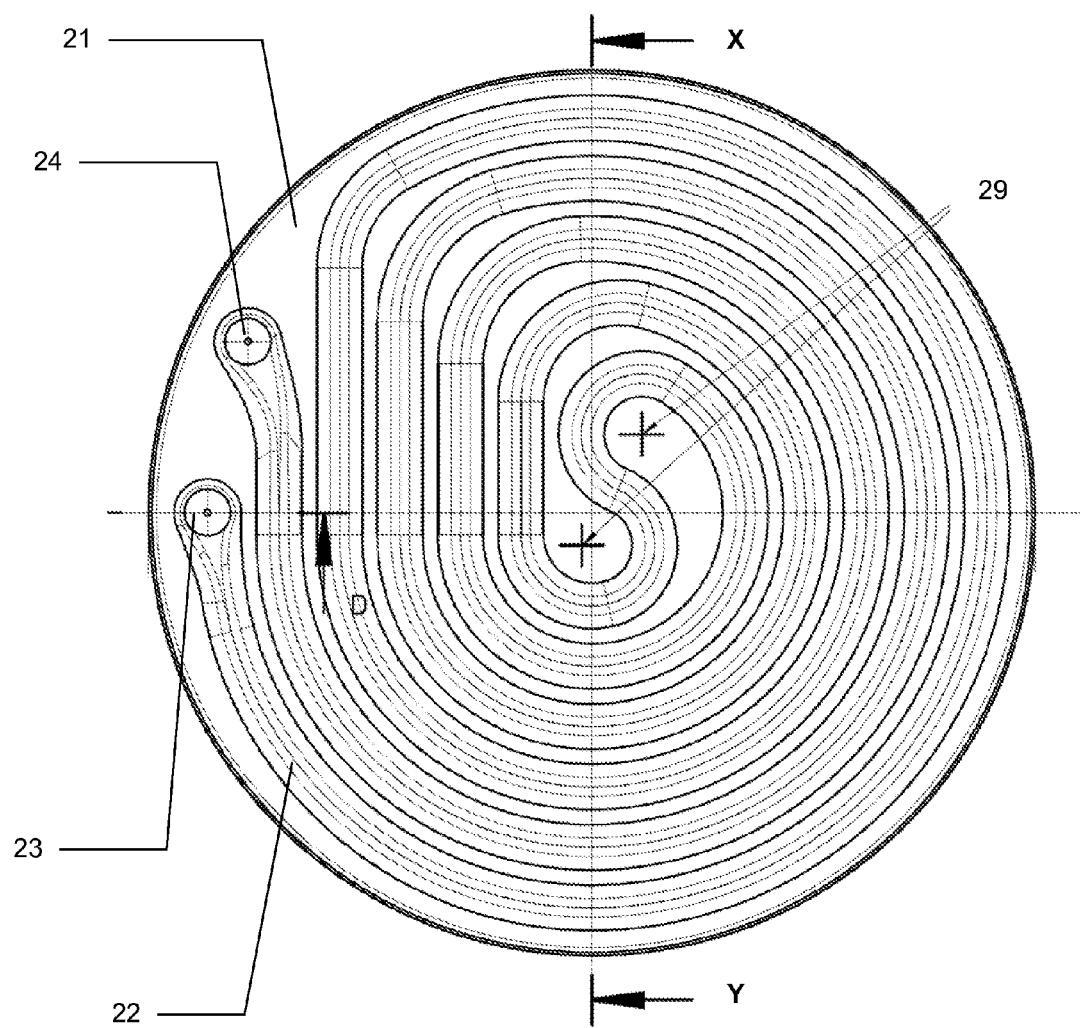
FIG. 4 is a plan view of a third embodiment of the present invention.
Figure 5A:
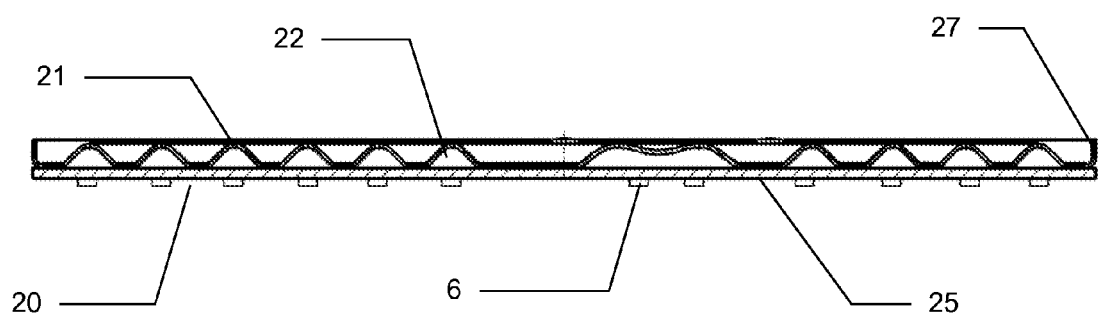
FIG. 5a is a cross sectional diagram through X-Y of the embodiment depicted in FIG. 4, in a first variant.
Figure 5B:
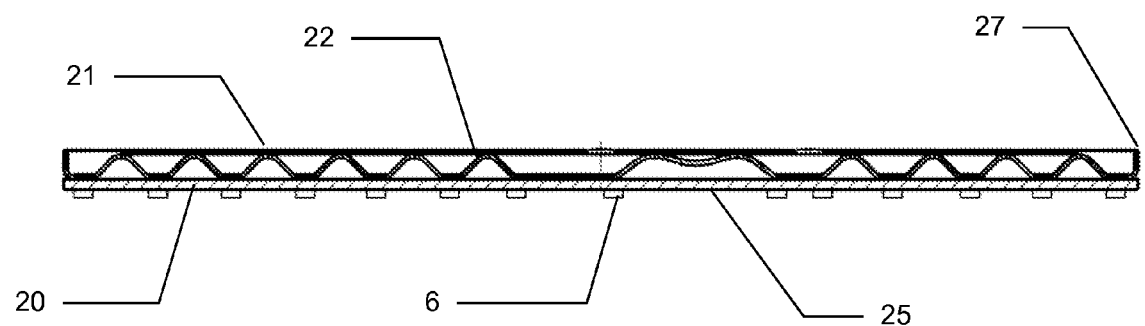
FIG. 5b is a cross sectional diagram through X-Y of the embodiment depicted in FIG. 4, in a second variant.

FIGS. 4, 5a and 5b disclose a third embodiment having a small thermal mass. This embodiment comprises a first flat plate 20, and a deep drawn plate 21 thinner than the flat plate 20. In other embodiments it is possible to use plates with the same or greater thickness than that of the flat plate 21. The shape of the deep drawn plate 21 is such that a channel 22 is formed by the enclosure between both plates 20, 21. Further the two plates 20, 21 are soldered or brazed together over substantially their full contact area, creating a sealed channel 22 especially suitable for the high pressures required for particular brewing processes, such as in an espresso maker. For example, portions of the plate 21 between adjacent portions of the channel 22 may provide substantially planar contact portions for securing and/or sealing to the plate 20.

The flat plate 20 is utilised as a metal substrate for thick film heating element 3, comprising an insulating layer 25 and a conducting resistor track 6 located on the insulating layer. This embodiment minimises materials to provide a low thermal mass and high power density. As with previous embodiments the track(s) of the thick film element 3 are aligned to cooperate with the form and shape of the channels and can be tuned so that the heat output in any given area matches the precise heat requirement of the liquid. The channels may also be made wider or deeper or formed in a different shape (e.g. rounder or flatter) in particular areas so the speed of flow of the liquid or the heat exchange characteristics can be modified locally; for example the channel 22 may be increased in cross section at the inlet and reduced towards the outlet so that the flow of the liquid is faster as it becomes hotter. The channel 22 may include indentations or forms (not illustrated) that may improve the heating characteristics of the flow of liquid, for example by increasing the turbulence to help prevent localised boiling.

Two apertures 23, 24 have been provided in the channel, adjacent to either end thereof for the flow of liquid into and out of the channel 22. The apertures 23 and 24 may be kept completely or substantially sealed until after the brazing process so that the channels do not become contaminated during the brazing process. In the case that the apertures 23 and 24 are kept completely sealed, care must be taken to equalise the pressure between channels 22 and the outside of the plates 20 and 21 during the heating and cooling of the braze process.

In the specific embodiment the apertures are formed, after the brazing process, from dome shaped features in the plate, the shape of which act to support the feature during the brazing process.

As illustrated, the apertures are shown on the top side of the assembly facing upwards; however in other embodiments the apertures could be formed to allow access from the side or alternatively through the substrate 4. In FIGS. 5a and 5b, the apertures face upwards.

The integrity of the join between the plates 20 and 21 can be better controlled if the plates do not distort or move apart during the brazing process. To assist in achieving this aim the deep drawn plate may be provided with a rim 27 around the edge. The rim 27 may project upwardly, transverse to the plane of the plate 21. In addition the deep drawn plate may be pre-formed with a lateral concave form so that the centre of the plate is higher than the rim 27. In this case, before the brazing process a force is applied to the plate 21 and a weld applied at positions marked 29 so that the plate 21 is brought into close contact with plate 20. This has a number of benefits including:

a. Precise control of the gap between the plates 20 and 21.
b. Precise control of the relative position of the plates 20 and 21 so that for example, the heating tracks of the thick film heating element 3 are correctly aligned with the channel 22.

As in the previous embodiments, the resistor tracks 6 are preferably aligned with channel(s) 22. In the variant shown in FIG. 5a, the resistor tracks 6 are aligned with the centres of the channels 22, to improve heat conduction directly into the channel(s) 22. In the variant of FIG. 5b, the resistor tracks 6 are aligned with the contact areas between the plates 20, 21, which form the boundaries between the channel portions. In this variant, heat in conducted into the channel(s) 22 through the plates 20 and 21, to provide more even heating of the channels. In a further variant (not shown), some of the resistor tracks 6 are aligned with the centre of the channel 22, while other resistor tracks 6 are aligned with the contact areas between the channels 22.

It is also important to ensure that the flat plate 20 does not sag during the elevated temperatures required for the braze. Therefore it may be necessary to provide additional temporary support for the plate, the support being substantially rigid, for example of metal or ceramic.

There may be some applications where the mass may be too low, in which case steps can be taken for example to increase the heat sink capabilities without substantially moving away from the low mass concept.

In one embodiment (not illustrated) two low mass assemblies, for example similar to FIGS. 3 and/or 4 may be placed on top of each other so that the coiled tube 15 and deep drawn plate 21 interlock. In this case the power to one or both of the assemblies can be switched dependent upon the needs of the application. For example both assemblies can be switched on for quick response and when the first assembly in line is switched off it may act as a heat sink for the second unit. Connections to and from the units could be made through the side or through the plate 20.

Assembly

Figure 6A:
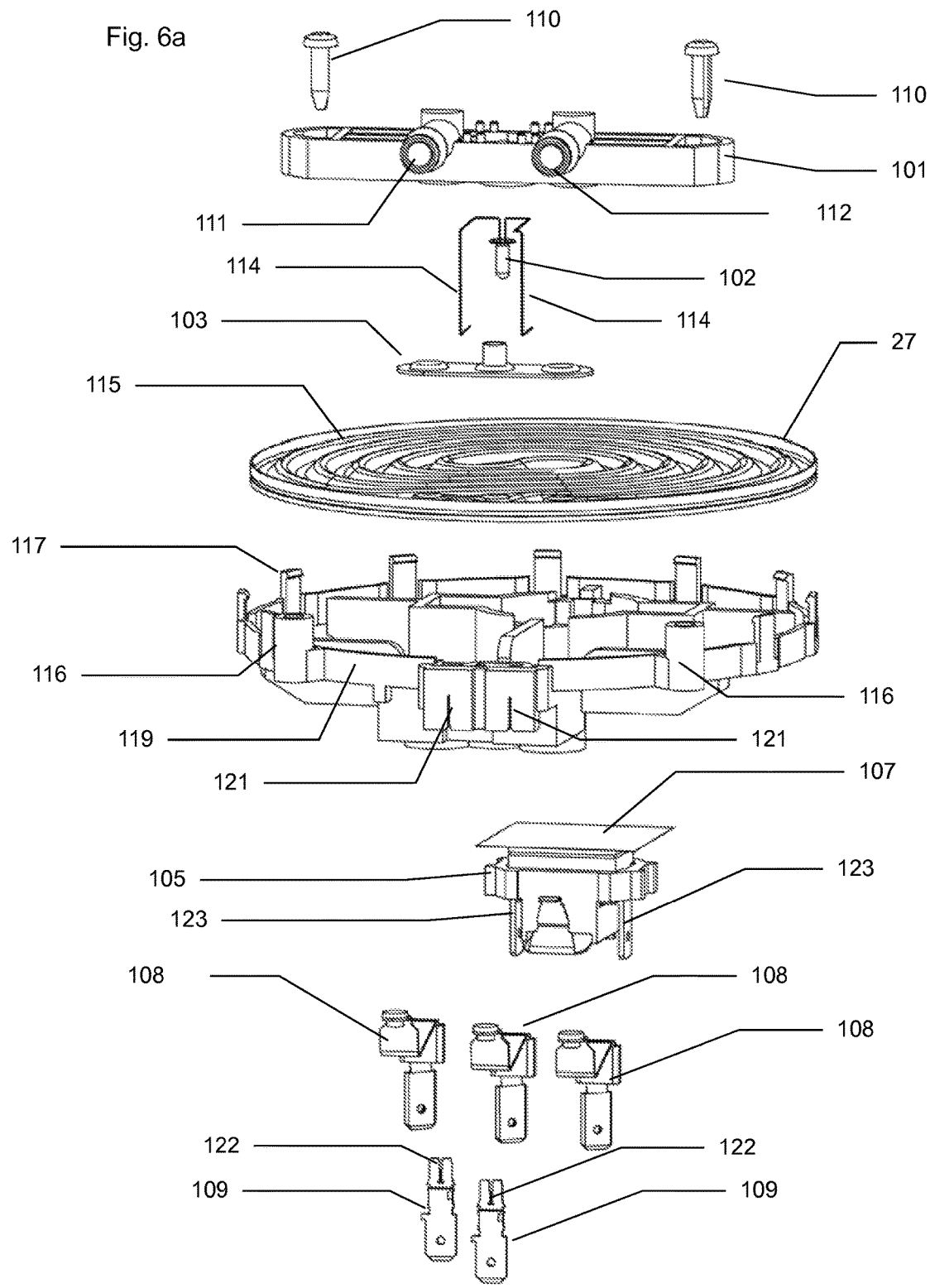
FIG. 6a is an exploded diagram of a complete heating assembly including the fourth embodiment.
Figure 6B:
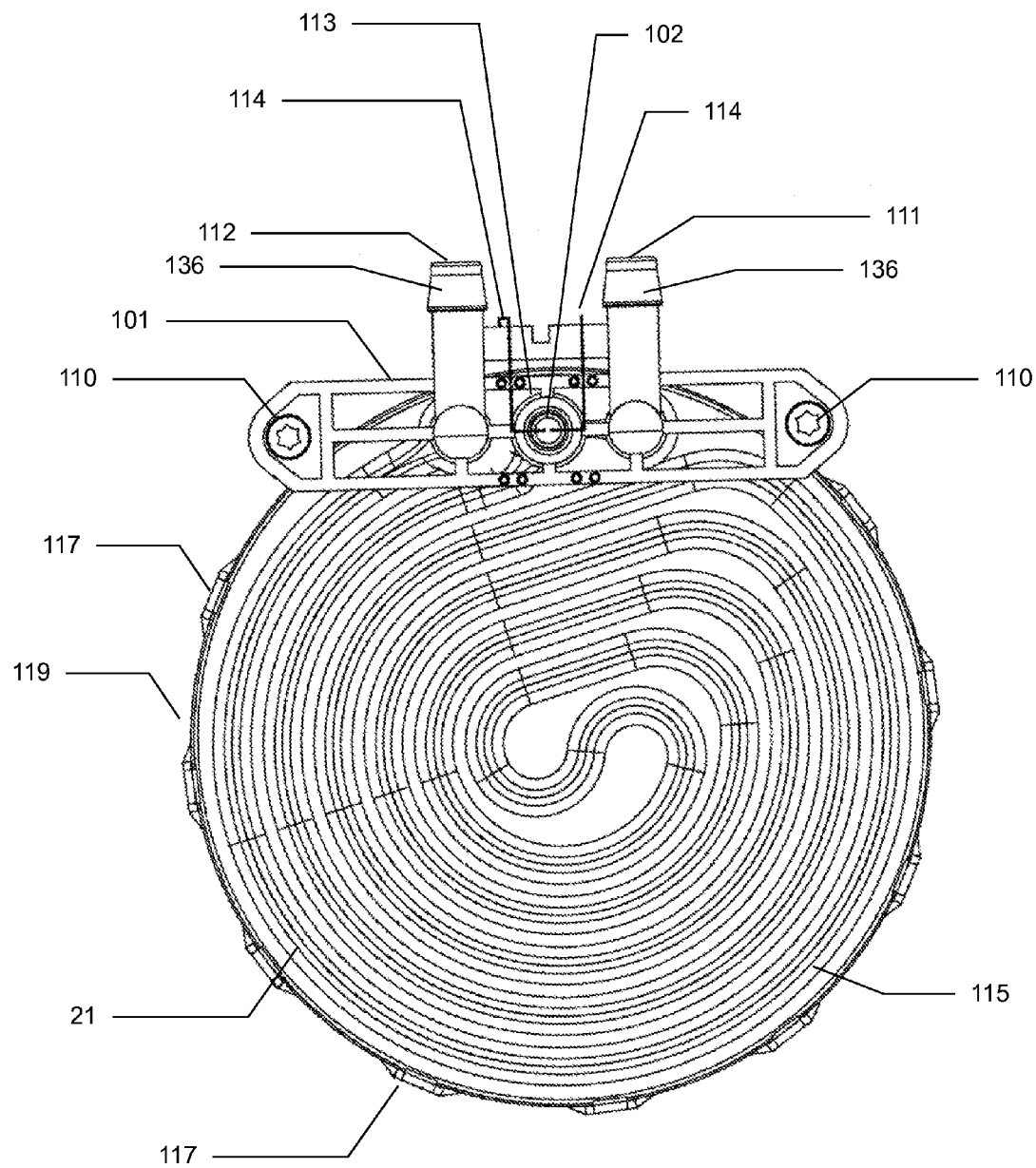
Figure 6C:
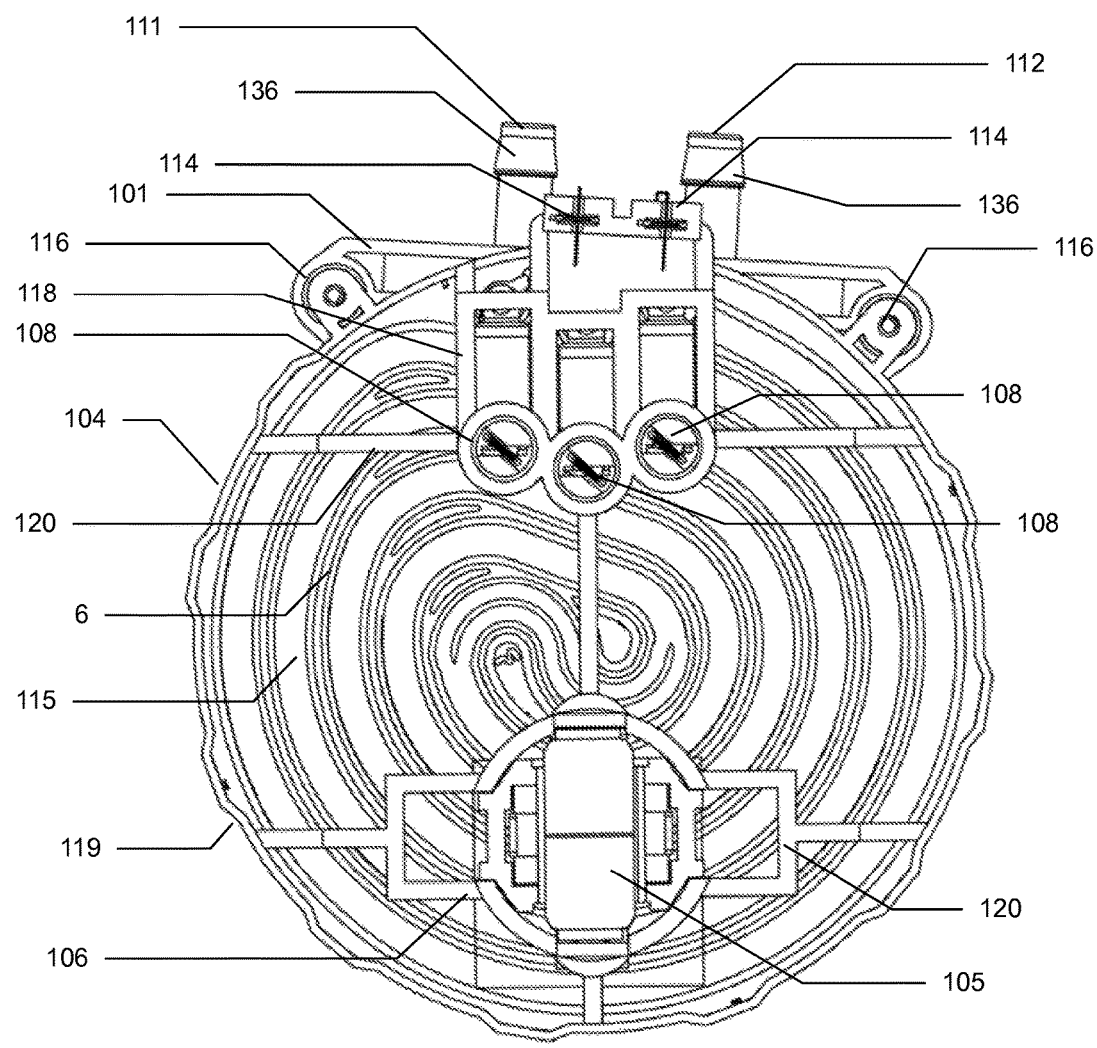
Figure 7A:
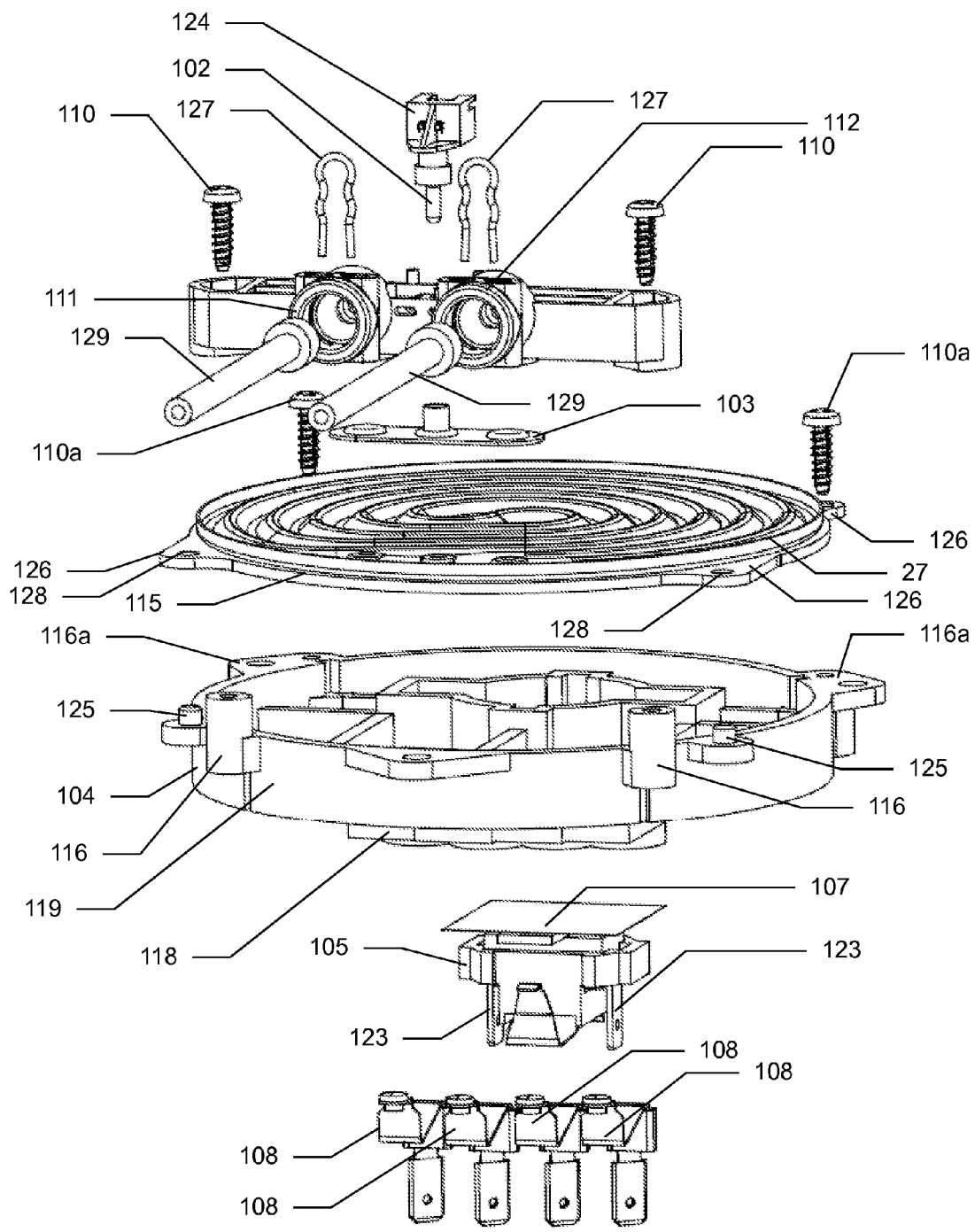
FIG. 7a is an exploded diagram of further complete heating assembly including the fourth embodiment.
Figure 7B:
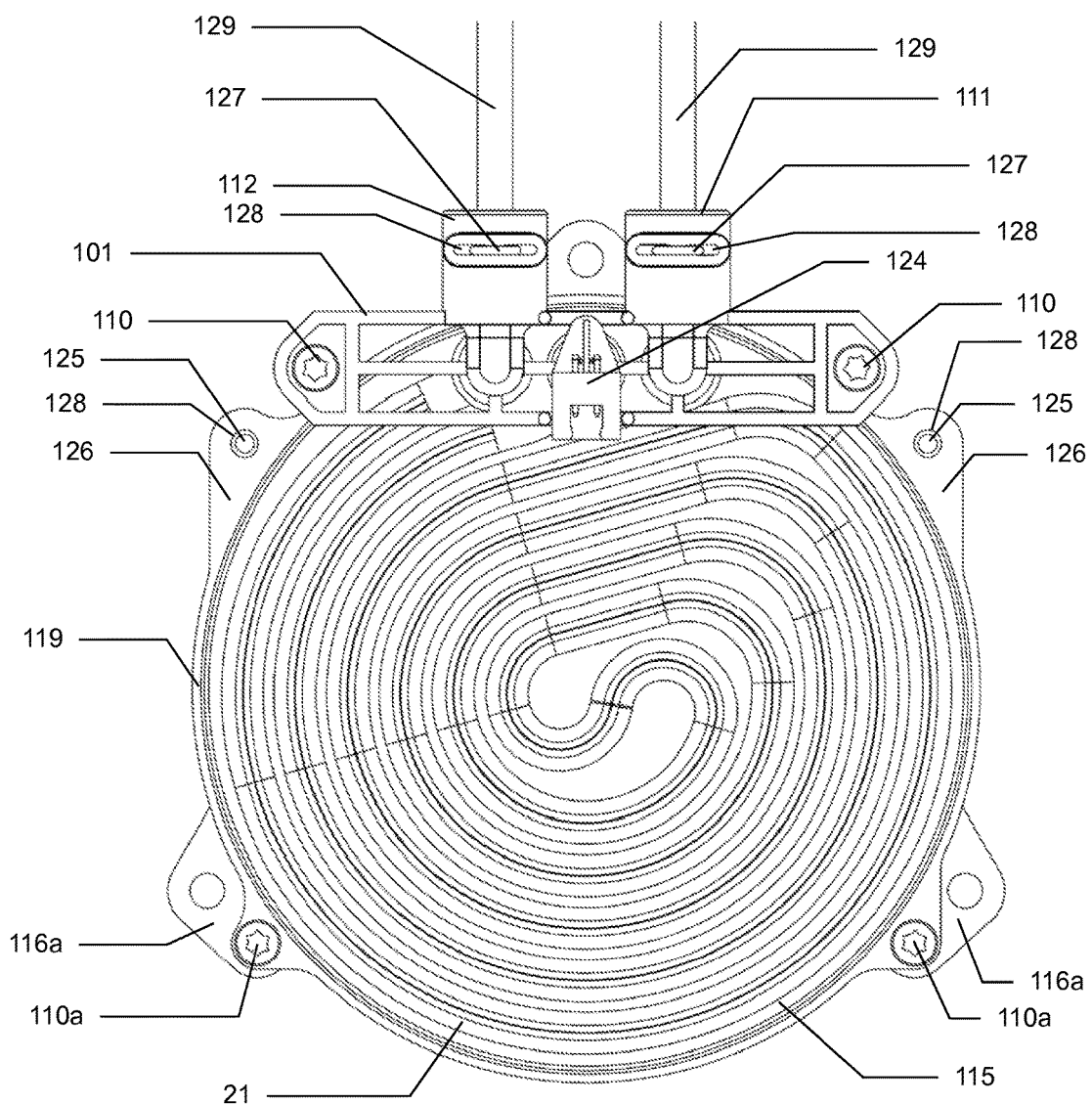
Figure 7C:
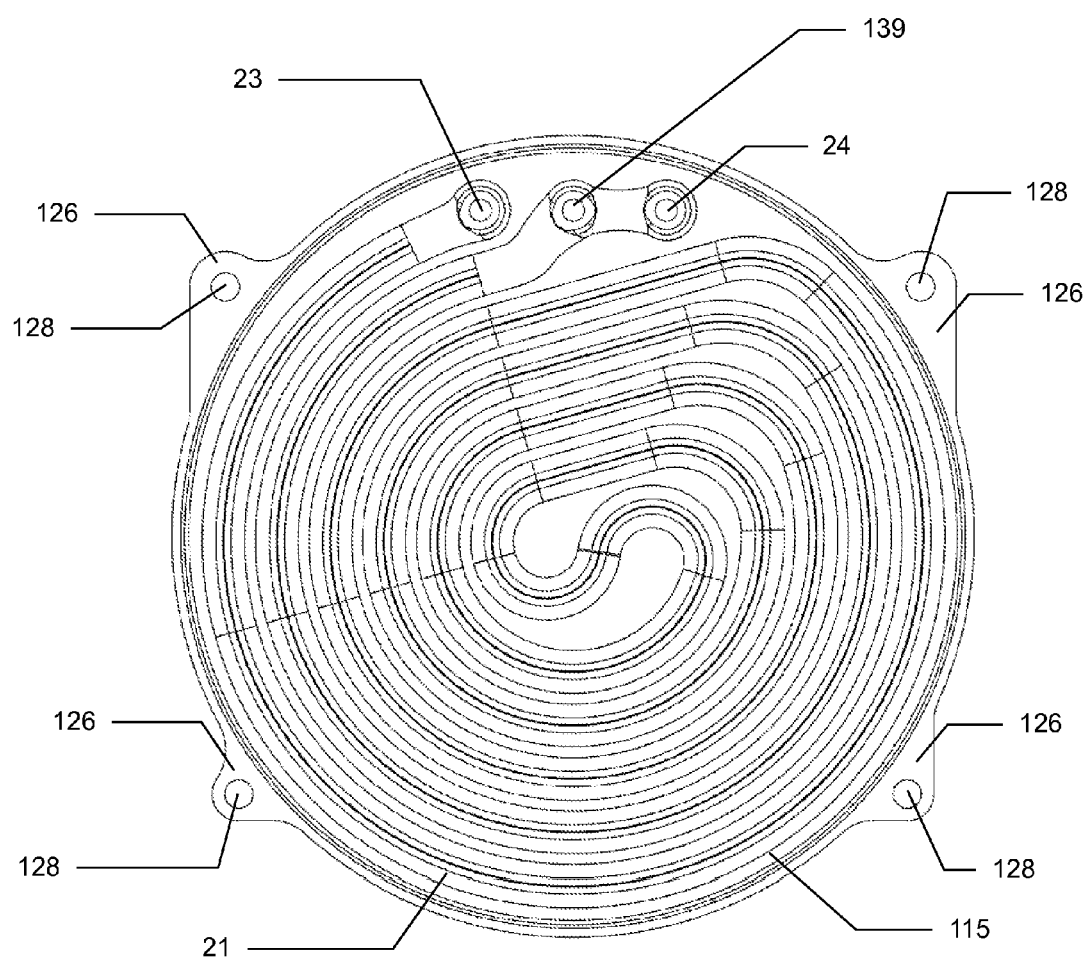
Figure 7D:
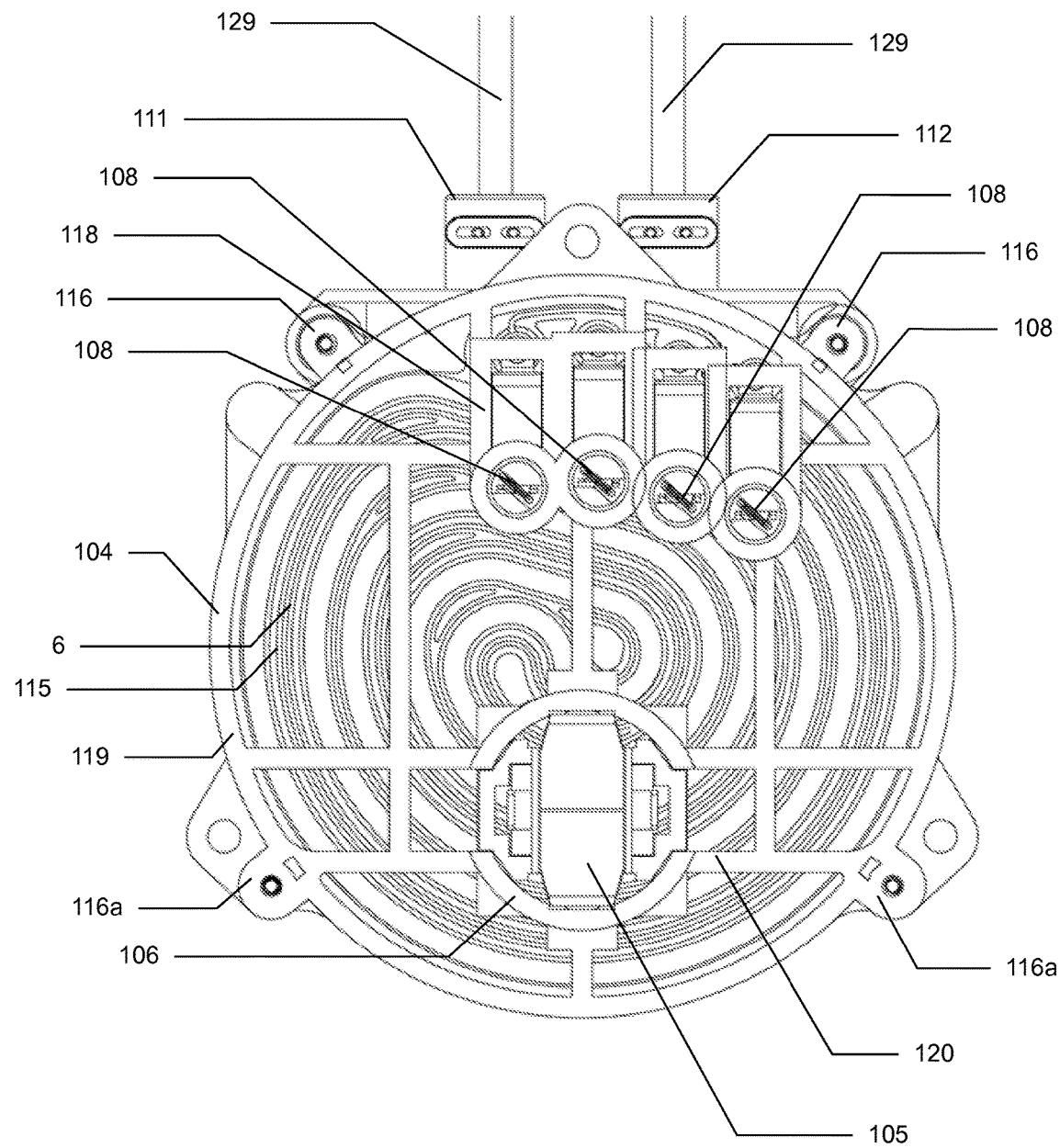
Figure 7E:
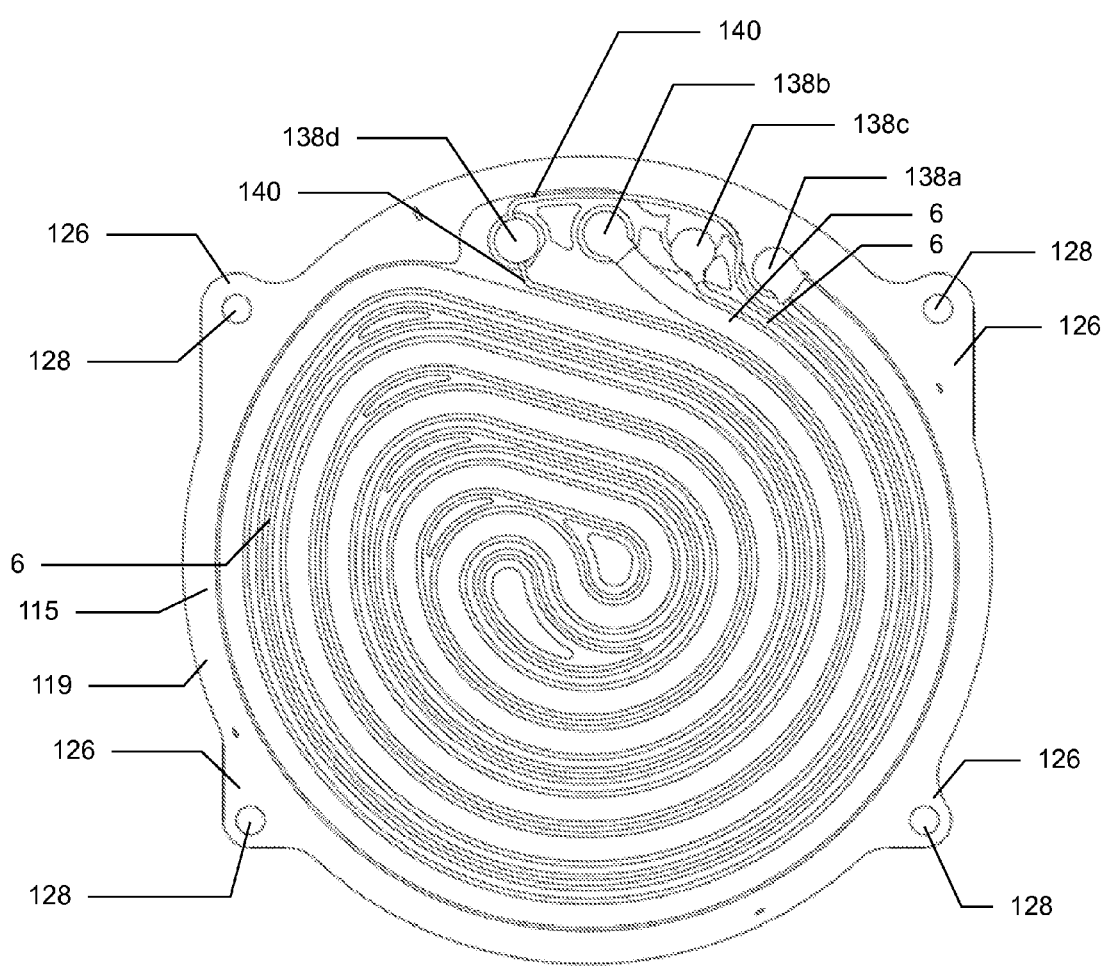
Figure 8A:
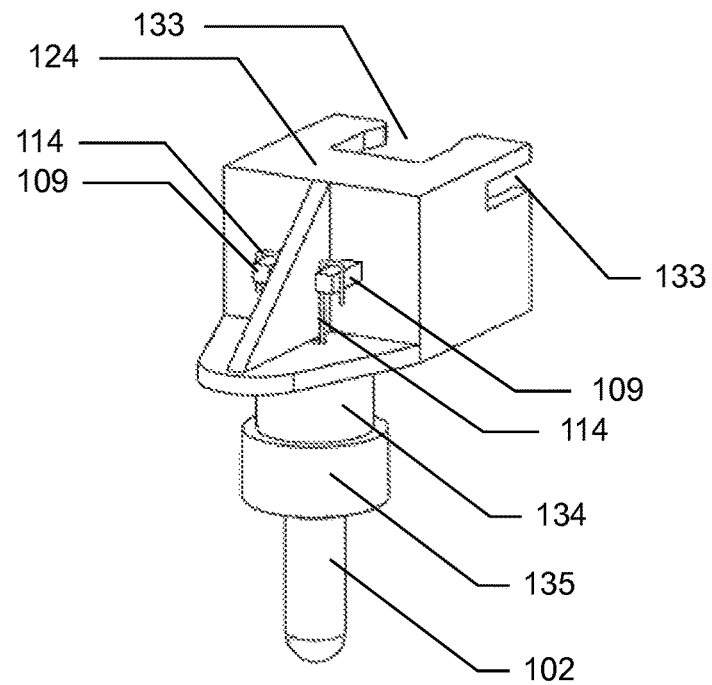
Figure 8B:
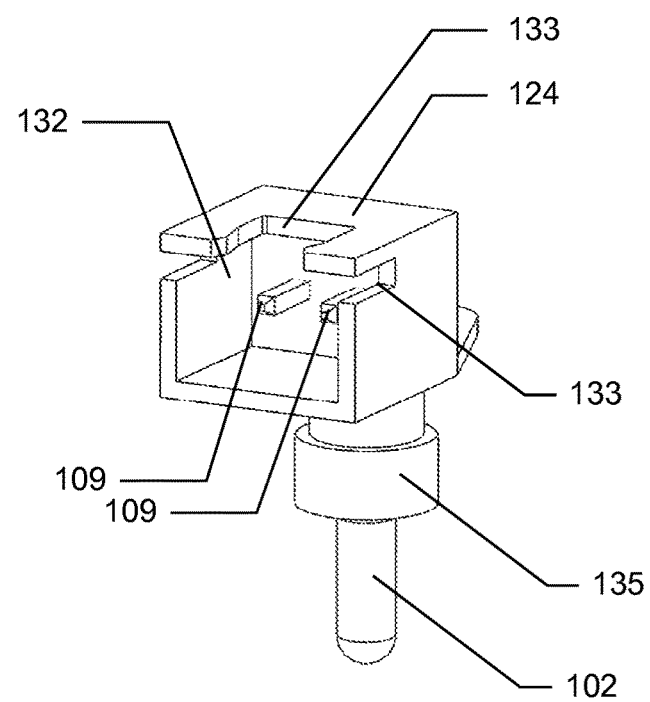
Figure 8C:
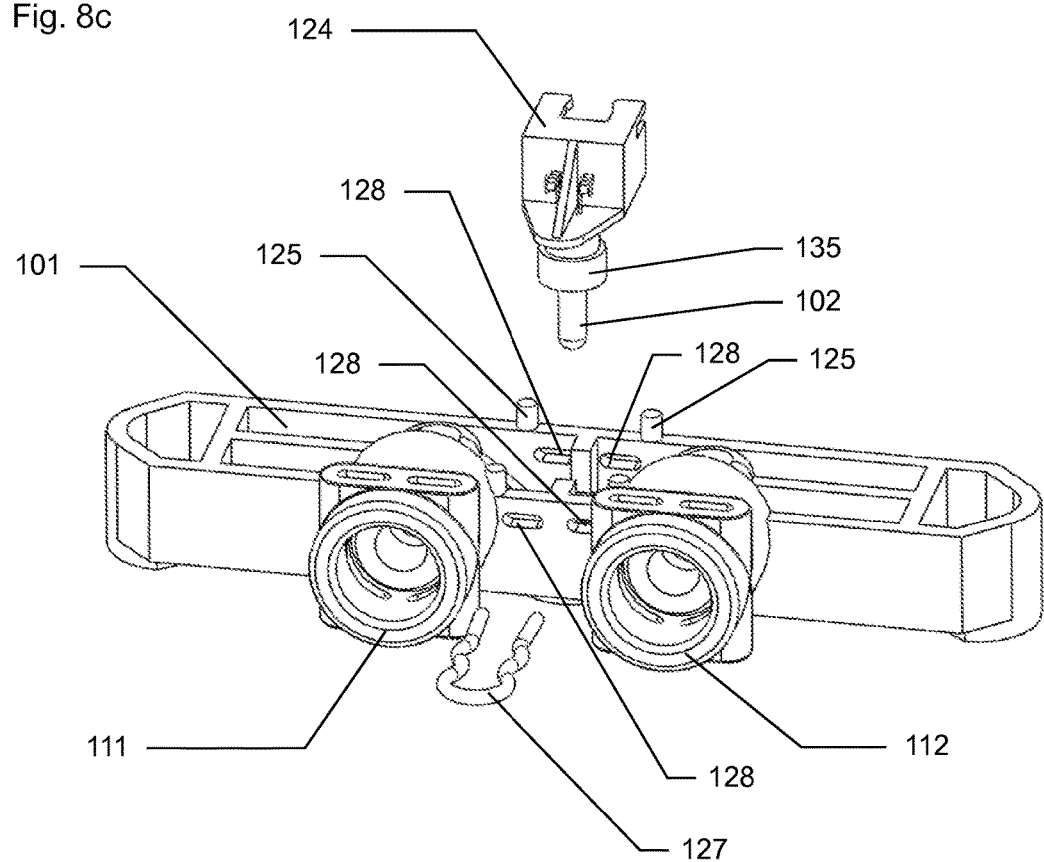
Figure 8D:
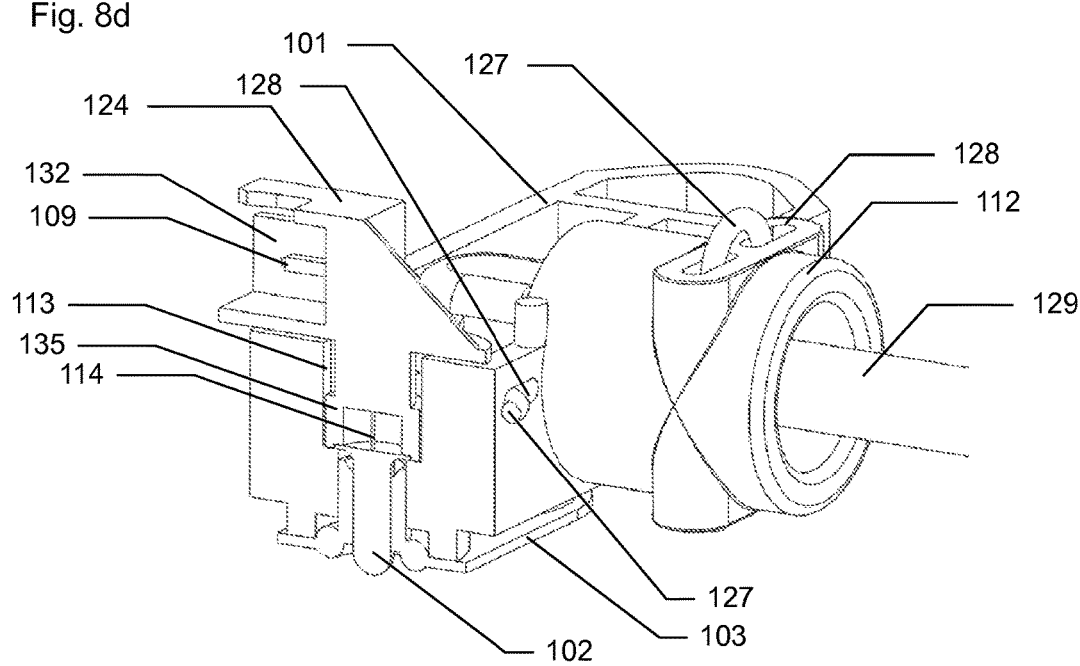

FIGS. 6a to 6c illustrate a complete assembly 1 including a Flow Through Heater (FTH) sub assembly 115, main housing 104, and fluid connector assembly 101.

In the preferred embodiment the FTH subassembly 115 comprises the low mass two-part thick film element substrate 20 and channel plate 21 assembly of the third embodiment; however it is envisaged that any suitable FTH can be incorporated including any heating means, for example thin film elements.

The main housing 104 may include an external rim 119 having one or more of click fit portions 117 which enable the main housing 104 to be attached to the FTH subassembly 115. Other attachment methods including, for example screw, clamp and bayonet type fittings may alternatively or additionally be employed.

The main housing 104 is positioned on the heating side of the FTH sub assembly 115.

The main housing 104 may also incorporate screw bosses 116 and at least one additional housing including for example a thermal fuse and/or thermostat housing 106 and a contact housing 118. The additional housings 106 and 118 may be attached directly to the rim 119 of the main housing 104 and additionally or alternatively may be attached to the main housing 104 with ribs 120. The main housing 104 may be of any suitable material for example plastic, metal or ceramic and may be formed, moulded or stamped as a one-piece assembly or may be a subassembly made up of separate components.

The fluid connector assembly 101 acts as an intermediate member to connect conduits 129 to and from the heater assembly 115 and also may connect other components such as a sensor 102 into the liquid channel. As illustrated the fluid connector assembly 101 serves to connect each conduit 129 indirectly to a respective channel 22, however in further embodiments the fluid connector assembly 101 may split the flow from one conduit 129 into more than one channel 22 or alternatively may direct more than one conduit 129 to a single channel 22.

The fluid connector assembly 101 may be positioned on the channel side of the FTH assembly 115 or at a position where the channel enters or exits the FTH assembly 115.

In this embodiment the fluid connector assembly 101 is secured against a seal 103 and the FTH subassembly 115 by screws 110 acting as a clamping means in conjunction with the screw bosses 116 on the main moulding 104. As illustrated, the seal 103 is a single seal that seals multiple apertures; alternatively, separate seals may be provided for each aperture. The FTH sub assembly 115 includes apertures 23 and 24 that are sealingly clamped against the fluid connector assembly 101 so that the inlet and outlet apertures 111 and 112 of the fluid connector assembly 101 act as the inlet and outlet of the FTH subassembly 115. A rim or ridge 136 may be provided towards the end of the inlet and outlet apertures 111 and 112 to facilitate a tube or conduit (not shown) being pushed over the apertures 111 and 112 and a suitable clip or other clamping arrangement (not shown) may be provided to secure the tube or conduit onto the inlet and outlet apertures 111 and 112.

As illustrated, the fluid connector assembly 101 connects the inlet aperture 111 to a single channel 22 and the outlet aperture 112 to a single channel 22.

The fluid connector assembly 101 may also house a sensor 102 which may be positioned on the surface of the FTH subassembly or may communicate through the seal 103 into the liquid channel 22 of the FTH subassembly 115.

In further embodiments there may be more than one sensor 102 and each fluid connector assembly 101 may house a plurality of inlets 111 and outlets 112 which may be positioned in one or more directions suitable to the particular application.

Other attachment, clamping and sealing means may be employed; for example the liquid inlet fluid connector assembly 101 may be moulded as an integral part of the housing 104 and the FTH subassembly 115 may be clamped against the housing 104.

Resilient springs 108 are arranged to pass through apertures in the contact housing 118 and interface with corresponding electrical contacts (not shown) on the resistor track 106 of the subassembly 115. This arrangement allows the resilient springs to be preassembled to the contact housing 118 and avoids the need to connect conducting wires directly onto the thick film heating element 6. The resilient springs 108 may include silver contacts or coating at the point at which contact is made with the resistor track 6. As illustrated, the resilient springs 108 may include connections 109, for example, tab terminals for connecting conductors from, for example, the appliance controls to the assembly 1. In alternative embodiments other suitable connection methods, for example soldering, welding or crimping, may be used.

The sensor 102 is positioned in the aperture 113 in the fluid connector assembly 101. The conductors 114 for electrical connection to the sensor 102 are folded around the complete assembly 1 and pass though slots 121 in the contact housing 118. The connectors 109 are then pushed into and retained by the connector housing 118, with the conductors 114 positioned in corresponding slots 122 in the connectors 109. The connectors 109 include tab terminals for connecting onto conducting wires; in alternative embodiments other suitable connection methods for example soldering, welding or crimping may be used. In further embodiments the conductors 114 may connect directly to an external wiring harness and/or a Printed Circuit Board (PCB, not shown).

In a preferred embodiment a thermal fuse 105 is positioned within the housing 106 and acts to disconnect the electrical supply to the assembly 1 in the case of an overheat condition. If required a suitable insulator 107, for example Kapton™, may be placed between the thermal fuse 105 and any live parts of the film heating element 6. In other embodiments the housing 106 may be used as support for sensors or other thermostatic means.

The thermal fuse 105 be connected to a wiring harness or alternatively electrically connected directly to the resistive track 6, for example in a similar manner to the previously described resilient springs 108. In other embodiments the housing 106 may be used as support for sensors or other thermostat means.

In further embodiments the thermal fuse, thermostat or sensor means may be located on the element plate 20 and may be printed as part of the resistive track 6.

FIGS. 7a to 7e illustrate a further embodiment of a complete assembly 1 including a Flow through Heater (FTH) sub assembly 115, main housing 104, and fluid connector assembly 101.

In this embodiment the FTH subassembly 115 comprises the low mass two-part thick film element substrate 20 and channel plate 21 as previously described.

The main housing 104 may include an external rim 119 having one or more of upwardly extending portions 125 which enable the main housing 104 to be aligned and engage with apertures 128 that may be provided on, for example, a flange 126 extending radially outwards from the element substrate of the FTH subassembly 115. The FTH subassembly 115 may be secured to the main housing 104 by, for example, screws 110a acting as a clamping means in cooperation with screw bosses 116a on the main moulding 104.

Other attachment methods including, for example click fit, screw, clamp and bayonet type fittings may alternatively or additionally be employed.

The main housing 104 is positioned on the heating side of the FTH sub assembly 115. The main housing 104 may incorporate screw bosses 116 and 116a and at least one additional housing including for example a thermal fuse and/or thermostat housing 106 and a contact housing 118. The additional housings 106 and 118 may be attached directly to the rim 119 of the main housing 104 and additionally or alternatively may be attached the main housing 104 with ribs 120. The main housing 104 may be of any suitable material for example plastic, metal or ceramic and may be formed, moulded or stamped as a one-piece assembly or may be a subassembly made up of separate components.

The fluid connector assembly 101 is positioned on the channel side of the FTH assembly 115. In this embodiment the fluid connector assembly 101 may be secured against a seal 103 and the FTH subassembly 115 by screws 110 acting as a clamping means in conjunction with the screw bosses 116 on the main moulding 104. The FTH sub assembly includes apertures 23, 24 that are sealingly clamped against apertures 137 in the fluid connector assembly 101 so that the inlet and outlet apertures 111 and 112 of the port inlet act as the inlet and outlet for the FTH subassembly 115.

Figure 9A:
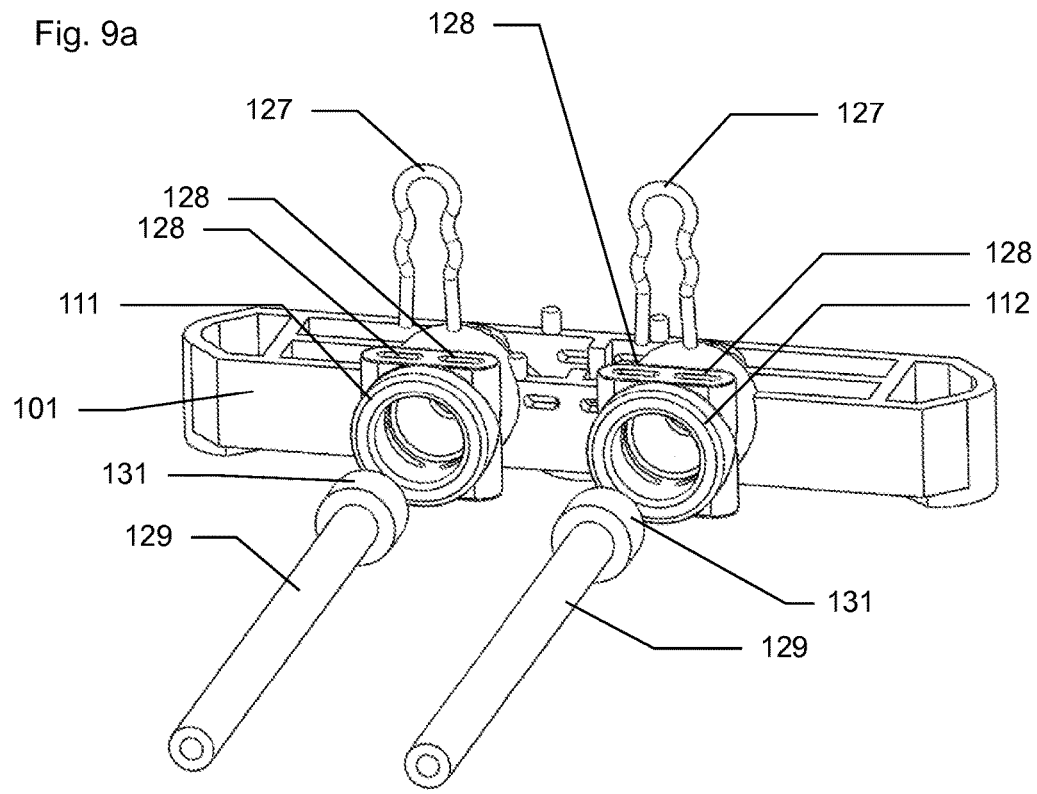
Figure 9B:
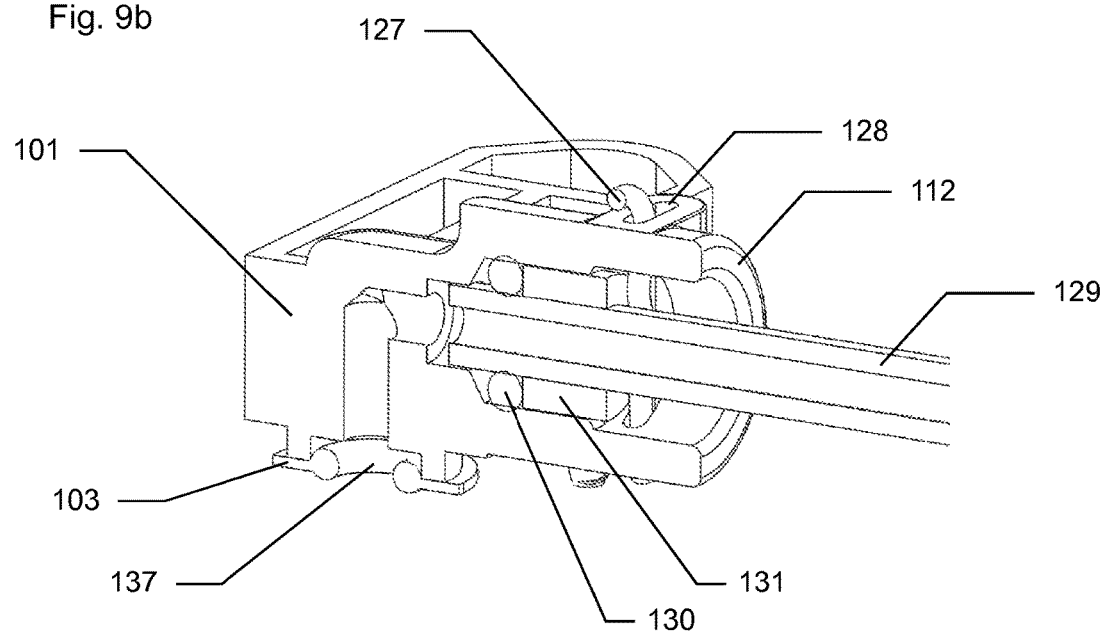

As illustrated in FIGS. 9a and 9b the inlet 111 and outlet 112 may be provided with an O' ring seal 130, clamping ring 131, spring clip 127 and aperture 128 so that the tube or conduit 129 may be sealingly installed into the fluid connector assembly 101. The clamping ring 131 may be pre-formed as a part of the tube or conduit 129 or may be pre-attached to the tube or conduit 129 ahead of assembly or alternatively the tube or conduit 129 may be inserted into the clamping ring 131 during assembly in which case the clamping ring 131 may be provided with an interference fit or some form of one-way clamping means that may prevent the withdrawal of the tube or conduit 129 from the clamping ring 131 after assembly. A retention means, for example the spring clip 127, may be inserted through the aperture 128 to prevent the withdrawal of the clamping ring 131 from the fluid connector assembly 101. In alternative embodiments alternative retention means may be provided.

The fluid connector assembly 101 may also house an integrated sensor housing 124 complete with sensor 102 which may be positioned on the surface of the FTH subassembly or may communicate through the seal 103 into, for example, an the aperture 139 in the liquid channel 22 of the FTH subassembly 115.

As illustrated in FIGS. 8a to 8d the integrated sensor housing 124 complete with sensor 102 and electrical and mechanical attachment means may be provided so that there is provision for a removably sealable method of installing the sensor 102 into the fluid connector assembly 101.

The front part of the integrated housing 124 may include electrical connecting conductors 109 and a socket housing 132 that may interface with a cooperating plug (not shown) and wires (not shown) so that the sensor 102 may be easily connected to sensing circuitry, for example, the appliance printed circuit board. The socket 132 may also be provided with recesses and slots 133 so that the socket 124 can be correctly aligned with the cooperating plug. The electrical connecting conductors 109 may be for example be oblong pins that communicate through to the back part of the housing 124. The housing 124 also includes a sleeve 134 that acts to support the sensor 102 and provide access for the sensor conductors 114 through the top part of the sleeve 134, into the back part of the housing 124, so that the conductors 114 may interface with connectors 109. As illustrated the conductors 114 are wrapped around the electrical connecting conductors 109, however it is envisaged that any connecting means for example soldering may be employed.

The sleeve 134 may also include a rim 135 that may interface with a spring clip 127 inserted through an aperture 128 so that the housing 124 is retained within the sensor aperture 113 in the fluid connector assembly 101. In further embodiments other methods of retention including screws or click fits (not shown) may be employed.

In this embodiment the tip of the sensor 102 is sealed through the fluid connector assembly 101 into the aperture 139 with the seal 103. However, other sealing means, for example, separate O-ring type seals may be employed.

In further embodiments there may be more than one sensor 102 and each fluid connector assembly 101 may house a plurality of inlets 111 and outlets 112 which may be positioned in one or more directions suitable to the particular application.

Other attachment, clamping and sealing means may be employed; for example the liquid inlet fluid connector assembly 101 may be moulded as an integral part of the housing 104 and the FTH subassembly 115 may be clamped against the housing 104.

Resilient springs 108 are arranged to pass through apertures in the contact housing 118 and interface with corresponding electrical contacts 138 on the resistor track 6 of the subassembly 115. This arrangement allows the resilient springs to be preassembled to the contact housing 118 and avoids the need to connect conducting wires directly onto the thick film heating element 6. The resilient springs 108 may include silver contacts or coating at the contact point 138 at which contact is made with the resistor track 6.

In this embodiment there are two separate heating tracks 6 so that contacts 138b and 138c act as, for example, live contacts for each resistor track 6 with, for example, a common neutral contact 138a. Contact 138d may connect to at least one sensor track 140, for example, the previously mentioned parallel E-fast™ system.

In this embodiment the heating tracks 6 are substantially beneath the channels 12 so that the heat is transferred directly into the liquid. The heating tracks 6 may be of different power ratings and energised at the same time or separately, dependent upon the specific requirements of the appliance. For example a lower power could be applied to the FTH ahead of dispensing so that any slug of liquid left in the FTH may be preheated to avoid cold liquid being dispensed at the outset of the cycle.

In this embodiment the there are two sensing tracks 140, each sensing approximately 50% of the surface and each substantially beneath the planar part of the channel plate 21 so that the area below the channel 22 may be kept free for the heating tracks 6. The planar portion of the channel plate 21 is relatively cool during normal use however in the case that, for example, the FTH is energised without liquid or the liquid flow is impeded, then the planar part of the channel plate 21 may overheat and the sensing track 140 will sense the overheat condition.

In other embodiments there may be fewer or additional contacts 138, resistive heating tracks 6 and sensing tracks 140.

As illustrated, the resilient springs 108 may include connections 109, for example, tab terminals for connecting conductors from, for example, the appliance controls to the assembly 1. In alternative embodiments other suitable connection methods, for example soldering, welding or crimping, may be used.

In a preferred embodiment a thermal fuse 105 is positioned within the housing 106 and acts to disconnect the electrical supply to the assembly 1 in the case of an overheat condition. If required a suitable insulator 107, for example Kapton™, may be placed between the thermal fuse 105 and any live parts of the film heating element 6. In other embodiments the housing 106 may be used as support for sensors or other thermostatic means.

The thermal fuse 105 be connected to a wiring harness or alternatively electrically connected directly to the resistive track 6, for example in a similar manner to the previously described resilient springs 108. In other embodiments the housing 106 may be used as support for sensors or other thermostat means.

In further embodiments the thermal fuse, thermostat or sensor means may be located on the element plate 20 and may be printed as part of the resistive track 6.

Additional Mass/Insulation

In further embodiments (not illustrated) additional mass or insulation may be added to the top side of the plate 21. The mass may also function as a heat dissipater or means to regulate the performance of the FTH according to specific appliance requirement. This could be in the form of a preformed cast material, for example, a metal alloy or alternatively a plastic, silicone or ceramic or any other suitable material. This may also take the form of a liquid material that is poured over the plate and allowed to set, in which case, for example, the rim 27 and/or rim 119 of the housing 104 may need to extend upwardly to contain the liquid.

Alternatively the additional mass may take the form of an alloy being applied in a further heating process so that the alloy melts and takes the form of the deep drawn plate.

Temperature Sensor(s)

Each of the liquid heating embodiments may include a sensor (such as the sensor 102), for example an NTC sensor or thermocouple, to measure the temperature of the liquid as it is heated. With the known large mass liquid heaters the sensor would be positioned within the flow of the liquid so that rapid fluctuations in temperature can be sensed. Advantageously in the low mass embodiments, for example as illustrated in FIGS. 3, 4 and 5 it may be possible to position the sensors on the outside of the liquid channel 22 or tube 15 and still sense the rapid temperature fluctuations. Recesses may be added to the channel 22 and tube 15 to improve the physical contact between the sensor and the heater and heat sink compound or tape may also be included in the assembly to further improve the heat transfer.

Multiple Tracks

As described, the thick film heater 3 may include a plurality of independently switchable thick film heating tracks 6, which may be selectively switched on or off or connected together in series or parallel to achieve the desired heating output and/or profile. In the flow-through heater embodiments, this feature may be used to determine the heating at different points along the flow-through channel 12, 22.

Multiple Channels

In the above embodiments, there may be more than one channel 12, 22 for the liquid to be heated: for example, there may be multiple channels 12, 22 either arranged in parallel, with a shared inlet and outlet, or independently, each with their own inlet and outlet, or there may be a single channel 12, 22 with one inlet and multiple outlets at different sections along the length of the channel, the flow of fluid from the outlets being controlled by one or more valves. There may be arranged independently switchable thick film heating tracks 6, aligned with the different channels or channel sections.

Brazing

In the above embodiments, the heating element 3 may be joined with the dissipater 2, plate 8, tube 15 or channel plate 21 by brazing, resulting in an alloy layer 7 therebetween. The alloy layer 7 may be formed across the entire surface of the substrate 4, or selectively in areas of the substrate 4, such as only at the areas of contact with the dissipater 2, plate 8, tube 15 or channel plate 21.

Brazing leads to a permanent connection between the heating element 3 and the dissipater 2, plate 8, tube 15 or channel plate 21 so as to minimise the tendency for warping caused by the heating and cooling cycles. The term brazing is understood to cover any connection method that relies on a heating process to provide an alloy based intermediate layer 7 between the substrate 4 and the dissipater 2, plate 8, tube 15 or channel plate 21, for example soldering.

When manufacturing the assembly the following typical temperatures must be considered:

Firing temperature range of electrically insulating layer—approximately –800-950° C.

Firing temperature range of thick film materials—approximately –625-750° C.

Melting temperature range of aluminium or alloy heat dissipater—approximately –490-650° C.

In one embodiment the thick film element 3 is manufactured as a first stage and soldered or brazed to the heat dissipater 2, plate 8, tube 15 or channel plate 21 as a second stage.

Such a method requires the use of a soldering or brazing alloy having a melting temperature lower than the heat dissipater 2, plate 8, tube 15 or channel plate 21 and lower than the temperature which would affect the thick film track 6 or the electrically insulating glass or glass-ceramic or porcelain enamel layer 5 onto which the thick film track 6 is applied. In practice this requires a soldering or brazing alloy of which the melting temperature is higher than 250° C. and lower than firing temperature of the thick film materials and/or the heat dissipater 2, plate 8, tube 15 or channel plate 21 (whichever is the lowest). The lower boundary is determined by the normal running temperature of the thick film element 3 in use during the life of the appliance. An example of such an alloy is zinc, which is preferably used with a suitable flux at a soldering or brazing temperature of 550° C.

Alternatively it is possible to make the soldering or brazing connection first and then apply insulating layer(s) 5 and thick film track(s) 6. This leads to a method for producing a combination of an electrical heating element 3 and a heat dissipater 2, plate 8, tube 15 or channel plate 21 to be heated by the electrical heating element 3; the method comprising the steps of providing a heating element 3 comprising a metal substrate 4 and providing a heat dissipater 2, plate 8, tube 15 or channel plate 21 comprising a layer of metallic material, wherein the substrate 4 of the heater is made of metallic material; the substrate 4 is brazed over substantially its full surface to the metallic layer of the heat dissipater 2, plate 8, tube 15 or channel plate 21 and subsequently the insulating layer 5 and subsequently a thick film heating track 6 are provided on the brazed substrate 4.

In each of the following specific embodiments the method of joining the substrate 4 to the dissipater 2, plate 8, tube 15 or channel plate 21 is described as brazing, but the inventors envisage that other joining methods may be applicable, including soldering, welding, laser welding, hot stamping, cold stamping, die-casting, gluing and induction or friction welding.

In a further embodiment it may be possible to apply the insulating layer 5 before the brazing or soldering, and the thick film track 6 after the brazing process.

As the soldering or brazing connection must not be affected by the later application of the thick film track 6, this method requires the use of a brazing alloy having a melting temperature higher than 900° C., for example a nickel based alloy.

Alternative Thick Film Heating Arrangements

In a variant of the above embodiments, it is envisaged that the insulating layer 5 and thick film track(s) 6 may be printed directly onto one or more sides of the heat dissipater 2, plate 8, tube 15 or channel plate 21, so removing the need for a separate substrate 4, and the subsequent fixture of the separate substrate 4 to the dissipater 2, plate 8, tube 15 or channel plate 21. In that case it will be necessary to match the materials of the dissipater 2 and the thick film track(s) 6 so that the melting temperature of the dissipater material is greater than the processing temperatures of the insulating layer(s) 5 and associated heating tracks 6.

The heat dissipater 2, plate 8, tube 15 or channel plate 21 may have a substantially flat upper surface on which the further insulating layer 5 and thick film track(s) 6 may be printed. The upper and lower surfaces of the dissipater 2, plate 8, tube 15 or channel plate 21 may be substantially parallel, so that the thick film track(s) 6 may be printed on one surface and the dissipater 2, plate 8, tube 15 or channel plate 21 then turned over for printing further thick film track(s) 6 on the opposite surface. The insulating layer(s) 5 may have been formed previously on both surfaces, for example by a coating and firing process, or each insulating layer 5 may be formed immediately before the thick film track(s) 6 is printed thereon.

In another alternative embodiment, first and second thick film heaters 3 as described above may be joined to the dissipater 2, plate 8, tube 15 or channel plate 21 so that their metallic substrates 4 are joined to respective opposite faces of the dissipater 2, plate 8, tube 15 or channel plate 21, using any of the joining techniques described above. In other words, the dissipater 2, plate 8, tube 15 or channel plate 21 may be sandwiched between the metallic substrates 4 of the first and second thick film heaters 3.

Alternative Embodiments

It will be clear that numerous other variations can be applied to the embodiments discussed above within the scope of the invention as defined by the appending claims. In particular features of the different embodiments can be combined.

The embodiments described above are illustrative of rather than limiting to the present invention. Alternative embodiments apparent on reading the above description may nevertheless fall within the scope of the invention.

The invention claimed is:

1. A flow-through heater comprising at least one first thick film electrical heating element having a metallic substrate, and a channel plate joined to the metallic substrate to form a channel therebetween, wherein adjacent portions of the channel are separated by substantially planar contact portions of the channel plate, which are secured to the substrate, wherein the heater comprises a sensor track arranged solely opposite to the substantially planar contact portions and a resistor track arranged solely opposite to the channel.

2. The heater of claim 1, wherein a face of the metallic substrate joined to the channel plate is substantially planar.

3. The heater of claim 1, wherein the channel plate is shaped so as to form the channel.

4. The heater of claim 1, wherein the metallic substrate and the channel plate are soldered or brazed together.

5. The heater of claim 1, wherein a central portion of the channel plate is welded to the substrate.

6. The heater of claim 1, wherein the channel plate comprises at least a second thick film electrical heating element.

7. The heater of claim 1, wherein a fluid connector assembly is positioned to a first side of the metallic substrate, providing an inlet and outlet to the channel and a housing is positioned to a second side of the metallic substrate, opposite to the first side, providing an electrical connection to the heating element, wherein the housing is fixed around the periphery of the substrate.

8. The heater of claim 7, wherein the fluid connector assembly houses a sensor for sensing liquid temperature within the channel.

9. The heater of claim 8, wherein the sensor has an integrated sensor housing for removable attachment to the fluid connector assembly.

10. The heater of claim 8, wherein the sensor housing includes an electrical connector for connection to sensing circuitry.

11. The heater of claim 8, wherein the sensor communicates through a seal in the fluid connector assembly.

12. The heater of claim 1, further comprising a thermal material disposed on the channel plate.

13. The heater of claim 12, wherein the thermal material is an insulator.

14. The heater of claim 12, wherein the thermal material is a heat dissipater.

15. The heater of claim 12, wherein the thermal material is pre-formed and mutually engages with the exterior of the channel plate.

16. The heater of claim 12, wherein the thermal material is a settable material disposed on the channel plate.

17. The heater of claim 1, including a thermostat arranged to disconnect an electrical connection to the heating element in an overheat condition.

18. The heater of claim 1, including a sensor track substantially aligned with the channel.

19. The heater of claim 1, having a fluid connector assembly providing an inlet and outlet to the channel.

20. The heater of claim 19, wherein the fluid connector assembly houses a sensor for sensing liquid temperature within the channel.

21. The heater of claim 1, having a housing providing an electrical connection to the heating element.

22. The heater of claim 21, wherein the housing is fixed around the periphery of the substrate.

23. A method of producing a thick film flow-through heater, comprising joining a channel plate to the metallic substrate of at least one first thick film heating element so as to form a channel therebetween, wherein adjacent portions of the channel are separated by substantially planar contact portions of the channel plate, which are secured to the substrate, wherein the substrate includes a sensor track arranged solely opposite to the substantially planar contact portions and a resistor track arranged solely opposite to the channel.

24. The method of claim 23, including forming the channel plate by a deep drawing process.

25. The method of claim 23, comprising fixing the channel plate to the metallic substrate by a first process, and subsequently sealing the channel plate to the metallic substrate by a second process.

26. The method of claim 25, wherein the first process comprises welding.

27. The method of claim 26, wherein the first process comprises welding a central portion of the channel plate to the substrate.

28. The method of claim 25, wherein the second process comprises brazing.

29. The method of claim 23, wherein the channel plate comprises at least a second thick film heating element.

30. The method of claim 23, including providing a thermostat arranged to disconnect an electrical connection to the heating element in an overheat condition.

31. The method of claim 23, wherein the metallic substrate includes a sensor track substantially aligned with the channel.

32. The method of claim 23, wherein the channel plate is provided with a concave form and a central portion of the channel plate is joined to the metallic substrate such that the channel plate becomes less concave.

33. The method of claim 23, comprising the further step of forming apertures in the channel plate after joining the channel plate to the metallic substrate.

34. The method of claim 23, comprising the further step of forming the apertures in the channel plate, after joining the channel plate to the metallic substrate, from projecting features which support the channel plate when joining the channel plate to the metallic substrate.

35. The method of claim 23, including adding thermal material to the channel plate after the joining step.

36. The method of claim 35, wherein the thermal material is an insulator.

37. The method of claim 35, wherein the thermal material is a heat dissipater.

38. The method of claim 35, wherein the material comprises pre-formed material.

39. The method of claim 35, wherein the material is provided as a liquid that is set on the channel plate.

40. The method of claim 39, wherein the channel plate includes means for retaining the liquid during setting.

41. The method of claim 23, wherein the channel plate has a peripheral rim projecting transversely to the plane of the channel plate.

42. The method of claim 23, wherein the join is performed by soldering or brazing.

43. The method of claim 23, including providing temporary support for the metallic substrate during the joining step.

44. The method of claim 23, wherein warping or distortion of the substrate is avoided.

45. The method of claim 23, further comprising assembling the substrate with a housing providing an electrical connection to the heating element.

46. The method of claim 45, wherein the housing is fixed around the periphery of the substrate.

47. The method of claim 23, further comprising assembling the substrate with a fluid connector assembly providing a liquid inlet and outlet.

48. The method of claim 47, wherein the fluid connector assembly houses a sensor for sensing liquid temperature within the channel.

49. The method of claim 48, wherein the sensor has an integrated sensor housing for removable attachment to the fluid connector assembly.

50. The method of claim 49, wherein the sensor housing includes an electrical connector for connection to sensing circuitry.

51. The method of claim 48, wherein the sensor communicates through a seal in the fluid connector assembly.

* * * * *